Figure 1:
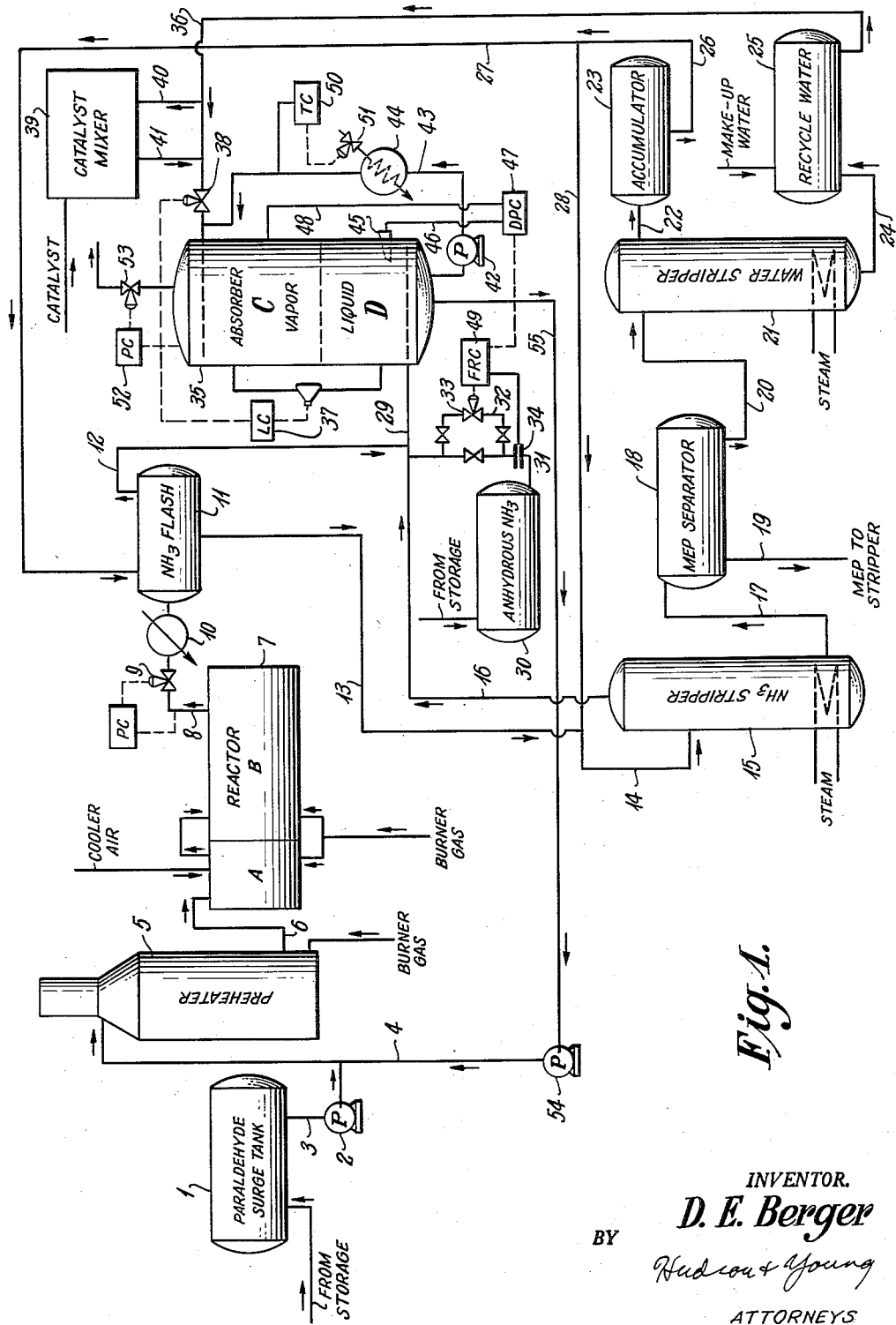

INVENTOR.
D. E. Berger

March 4, 1958

D. E. BERGER 2,825,630

COMPOSITION CONTROL OF AQUEOUS AMMONIA
SOLUTION BY DIFFERENTIAL PRESSURE

Filed April 30, 1954

3 Sheets-Sheet 3

INVENTOR.
D. E. Berger
BY
Hudson & Young
ATTORNEYS

United States Patent Office 2,825,630
Patented Mar. 4, 1958

2,825,630

COMPOSITION CONTROL OF AQUEOUS AMMONIA SOLUTION BY DIFFERENTIAL PRESSURE

Donald E. Berger, Bartlesville, Okla., assignor to Phillips Petroleum Company, a corporation of Delaware Application April 30, 1954, Serial No. 426,787

8 Claims. (Cl. 23—193)

This invention relates to a process for making substituted pyridines by the condensation of an aldehyde or a ketone with ammonia. In one of its aspects this invention relates to a means for controlling aqueous ammonia concentration fed to a substituted pyridine reactor. In a more specific aspect, this invention relates to an improved method for controlling the ammonia concentration in an aqua ammonia stream produced by an ammonia absorber.

The condensation of aldehydes and ketones, either saturated or unsaturated, and derivatives thereof with ammonia or its derivative to form substituted pyridines is one of the oldest of organic reactions. See R. L. Frank et al., Journal of the American Chemical Society 71, pages 2629 et seq. (August 1949), and R. L. Frank et al., Journal of the American Chemical Society 68, pages 1368–9 (July 1946).

One method for producing these substituted pyridine products is to react an aqueous solution of ammonia with an aldehyde, ketone or derivative thereof at elevated temperature and generally in the presence of a catalyst. I will refer to the aldehydes, ketones and derivatives thereof as carbonyl compounds throughout this discussion. This synthesis step requires an aqueous ammonia stream of 25 to 40 weight percent ammonia. When the ammonia concentration is too high, the excess ammonia leads to overloading of the recovery equipment. Too low ammonia concentration leads to low conversion or reaction efficiency because the carbonyl will be incompletely converted or will be partially consumed by side reactions in the absence of some excess ammonia. As has been said, the synthesis can utilize ammonia solution in the concentration range from 25 to 40 weight percent but fluctuations within this range will upset the process control. For best control and optimum conversion, it is desirable to operate in the narrow limits of 30 to 35 percent ammonia concentration and to control the selected concentration within plus or minus 2 percent. With this strict control only minor surges in the process are encountered which are readily tolerated. Ammonia for this process is prepared by dissolving ammonia in water in an absorber. Three sources contribute ammonia to the absorber, namely fresh anhydrous ammonia, recycle ammonia flashed from the reactor, and ammonia stripped from the product as will be seen from the detailed discussion of this invention. The last two named sources of ammonia are subject to variations in the process and therefore a pre-set flow of anhydrous ammonia will lead to comparable variations in the ammonia concentration prepared in the absorber. While my invention is primarily concerned with controlling the ammonia concentration in aqueous solution for feeding a synthesis unit for producing pyridine derivatives by condensation of a carbonyl compound with ammonia, it will be obvious to those skilled in the art that the absorber and method of this invention can be used wherever aqueous ammonia is being prepared. When such a solution is prepared by simply adding anhydrous ammonia to water, such control is not especially required. This invention is particularly useful where aqueous ammonia is being prepared from a source of anhydrous ammonia in conjunction with one or more streams of ammonia of variable flow.

An object of this invention is to provide a method of controlling the concentration of ammonia in aqueous solution prepared in an ammonia absorber. Another object of this invention is to provide an apparatus for preparing aqueous ammonia of a predetermined concentration. Still another object of this invention is to provide a method and apparatus for controlling the aqueous ammonia concentration in the synthesis of pyridine derivatives by condensing a carbonyl compound with ammonia.

As has been said, this invention is particularly useful in the preparation of pyridine derivatives by the condensation of a carbonyl compound with ammonia and for that reason, I will further explain this invention in terms of such a reaction. As has been said, the condensation of a carbonyl compound with ammonia to form pyridine derivatives is one of the oldest in the art and no lengthy discussion is needed here. The carbonyl compounds are known in the art and illustrative examples are set forth in detail in the above-named Frank et al. references. Some examples are acetaldehyde, crotonaldehyde, crotonaldehyde diethyl acetal, paraldehyde, benzalacetophenone, benzaldiacetophenone, ethylideneacetone, parachlorobenzaldiacetophenone, and anisaldiacetophenone. Also mixtures of these materials may be used. These carbonyl products when condensed with ammonia yield a mixture of pyridines, however, by selecting a proper catalyst and condensation conditions, the yield will be primarily 2-methyl-5-ethylpyridine for the first four materials, 2,4,6-triphenylpyridine for the next two, 2,4,6-collidine,4(para-chlorophenyl)-2,6-diphenylpyridine, and 4-anisyl-2,6-diphenylpyridine for each of the others respectively.

Generally a catalyst is used, and I prefer a fluorine containing catalyst such as ammonium fluoride, ammonium bifluoride, boron trifluoride these preferably in a complex with ammonia or an amine; salts of fluoroboric acid, salts of the fluorophosphoric acids, salts of trifluoroacetic acid and salts of fluosilicic acid. However, other catalysts known in the art can be used such as ammonium chloride, ammonium acetate, alumina, sulfonic acids, etc.

The pyridine derivative made by the above process of great commercial importance at the present time is MEP (2-methyl-5-ethylpyridine) which can be made by condensing paraldehyde with ammonia. MEP is useful as an intermediate in the production of MVP (2-methyl-5-vinylpyridine) which has a host of uses in polymerization processes. For that reason, I will further explain my invention by describing it in an MEP synthesis process wherein paraldehyde is condensed with ammonia to form MEP.

Figure 2:
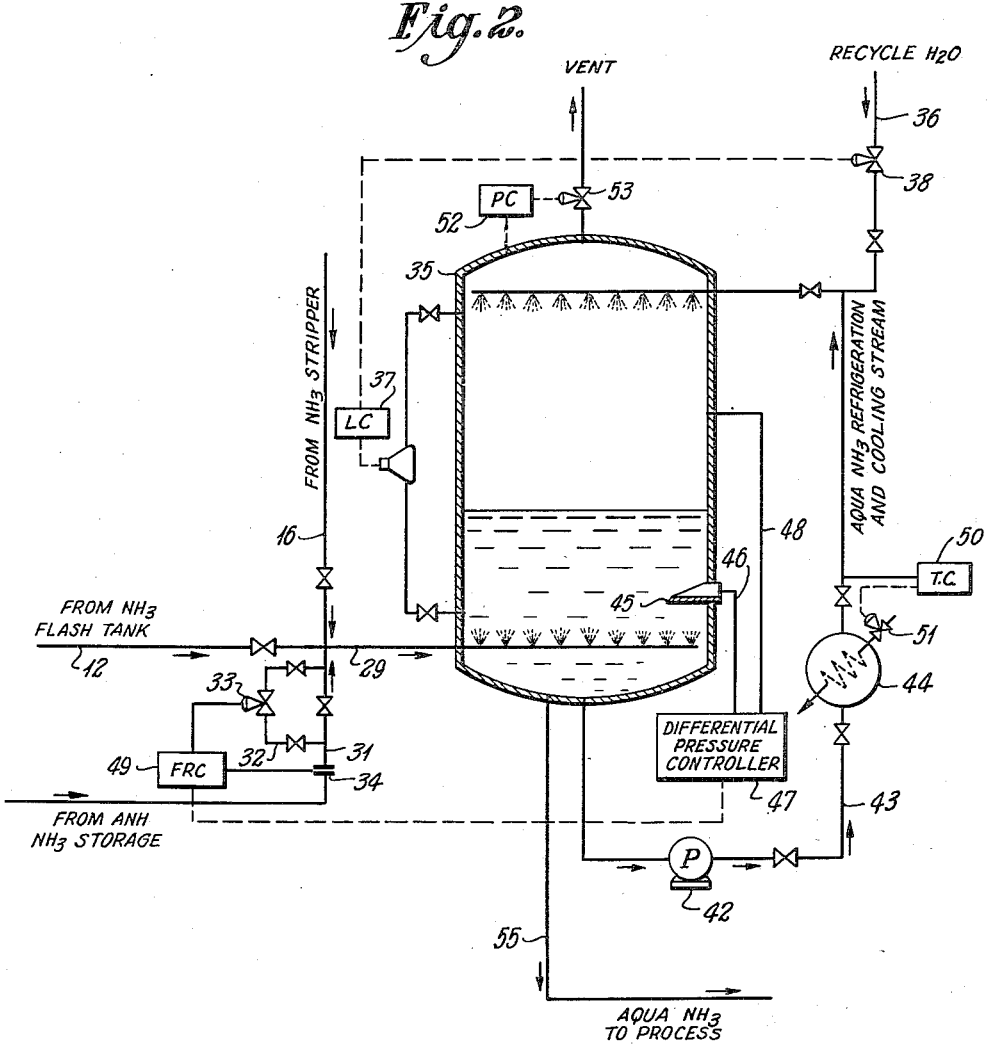
Figure 3:
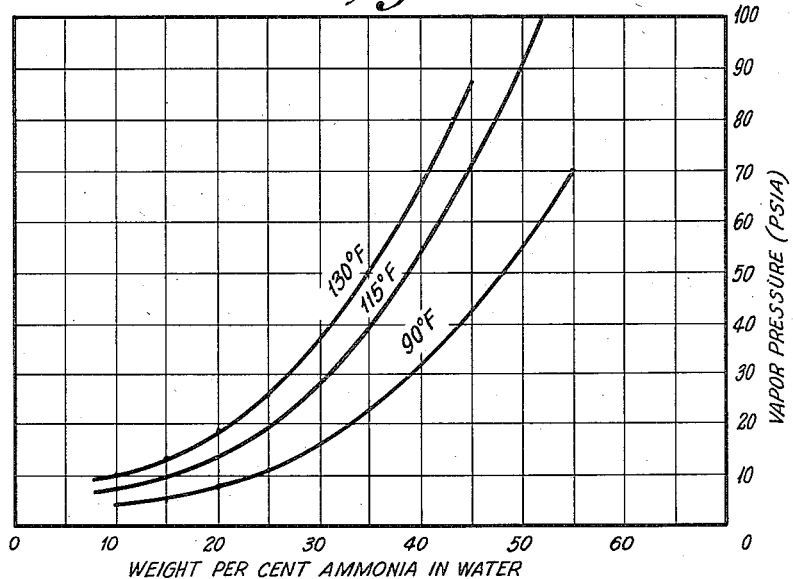
Figure 4:
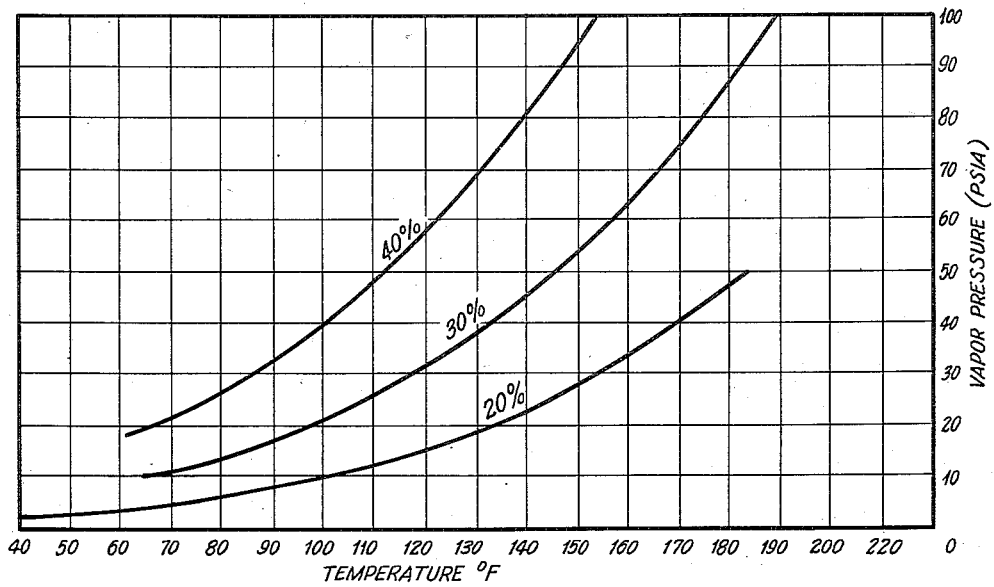

This invention can best be described by referring to the attached drawings of which:

Figure 1 is a flow diagram of an MEP synthesis process showing schematically how my invention is used in such a process, Figure 2 is a schematic vertical section of the absorber and controls of my invention. The reference numerals are the same as used in Figure 1 for the same elements, Figure 3 is a plot of ammonia concentration versus vapor pressure at various temperatures, and, Figure 4 is a plot of temperature against vapor pressure for various aqueous ammonia concentration.

Referring to Figure 1, paraldehyde from surge tank 1 is pumped at about 2000 pounds per square inch gauge (p. s. i. g.) via pump 2 and conduit 3 to conduit 4 where it joins a stream of aqueous ammonia which generally contains the condensation catalyst. The pressure must be sufficient to maintain the reactants as a liquid phase under reaction conditions and can vary from about 850 p. s. i. g. to over 2500 p. s. i. g. These reaction ingredients then pass to preheater 5 where the temperature is raised to 500° F. The temperatures generally used can range from 350 to 650° F. but are more commonly between 450 and 550° F. The hot reaction ingredients pass via conduit 6 to reactor 7. The residence time in the reactor is approximately 15 minutes but contact time can vary from 5 minutes to several hours. The reactor 7 is divided into two zones A and B. In zone A, both burners and coolers are used to control the temperature since the reaction is slightly exothermic but requires high temperature to proceed. In the zone B, only burners are used since the greater portion of the reactants will react in zone A so that zone B is used for additional residence time. The stream containing the reacted materials passes from reactor 7 via conduit 8, to pressure reducing valve 9 wherein the pressure is dropped to approximately 60 p. s. i. g. This reduction in pressure cools the stream to between 250-300° F. and at the same time vaporizes most of the ammonia and part of the water. The stream is further cooled by means of cooler 10 and then passes to flash vessel 11. A large portion of the ammonia is flashed from the stream in this vessel and is removed through conduit 12.

The water, MEP formed in the reactor, dissolved ammonia and condensation byproducts pass via conduits 13 and 14 to stripper 15 wherein most of the remaining dissolved ammonia is driven off by heat through conduit 16. The organic and aqueous phases are passed via conduit 17 to vessel 18 where they are separated, the organic phase being removed via conduit 19. The water phase then passes via conduit 20 to stripper 21 wherein the last traces of ammonia and dissolved pyridines are removed via conduit 22 to accumulator 23. The water from stripper 21 is sent via conduit 24 to recycle water tank 25. Water, pyridines and ammonia from accumulator 23 are returned to the system via either conduits 26 and 27 to the ammonia flash vessel 11 or via conduits 26, 28 and 14 to the stripper 15.

Ammonia from flash vessel 11 and stripper 15 passes via conduits 12 and 16, respectively, to ammonia header conduit 29. Anhydrous ammonia from vessel 30 passes via conduits 31 and 32, flow control valve 33 and orifice 34 to said header conduit 29. The valves in conduits 31 and 32 are provided so that manual operation is possible if desired, for example, when valve 33 is down for overhaul. The amount of ammonia passing to conduit 29 from flash vessel 11 and stripper 15 varies with operating conditions so in order to control the total ammonia passing to conduit 29, the ammonia from vessel 30 will have to be varied to compensate for fluctuations from the other two sources. This is done by means of valve 33 as will be later shown. The ammonia from conduit 29 is introduced into the bottom of absorber 35. At the same time water from vessel 25 is introduced into the top of absorber 35 via conduit 36. The liquid level is controlled in absorber 35 by means of level controller 37 which actuates valve 38 in response to the level change admitting more or less water. When a soluble catalyst is being used the water from conduit 36 can pass to catalyst mixer 39 via conduit 40 where it dissolves the catalyst and returns to conduit 36 via conduit 41.

The desired temperature of the absorber is about 115° F. but it may be any temperature from 90° F. to 140° F. so long as the selected temperature is maintained reasonably constant. If the temperature in the absorber remains constant, then the pressure in vapor phase C above the liquid phase D will be dependent upon the concentration of ammonia in the liquid phase. However, since recycle water containing no ammonia is added continuously to the absorber, to obtain near equilibrium relations of the vapor and liquid phases, the liquid D is recirculated at a moderate rate by means of pump 42, cooler 44 and conduit 43. The cooler removes the heat of solution of ammonia in water and serves to maintain the absorber temperature at the desired level. A temperature controller 50 is operably connected by a temperature sensing element in conduit 43. This controller is also operably connected to valve 51 and admits more or less coolant to cooler 44 in response to changes in temperature of liquid in conduit 43.

A sealed bulb or cell 45 containing an aqueous solution of ammonia of a known concentration is inserted in the liquid phase of the absorber 35. The aqueous solution in bulb 45 will be at the same temperature as the surrounding liquid. This bulb is connected to differential pressure controller 47 via conduit 46. The differential pressure controller is also connected to the vapor zone of absorber 35 via conduit 48. This differential pressure controller is in turn operably connected to flow recorder controller 49 which is in turn operably connected to orifice 34 and to control valve 33. The flow recorder controller 49 is set to maintain a selected rate of fresh ammonia flow as measured by orifice 34, by proper positioning of valve 33. The selected flow rate can be varied in response to an air signal from differential pressure controller 47 which resets the selected rate. Therefore the rate of flow of ammonia through orifice 34 is controlled by the difference in pressure between the vapor pressure in the absorber and the vapor pressure of a known concentration of aqueous ammonia at the same temperature as the absorber. Since the known solution in bulb 45 is blended to have a concentration in the same range as desired in the absorber, only a small differential pressure will exist between it and the absorber pressure, and this will remain true in spite of temperature variations of the entire system. If a differential pressure does occur, it will be sensed and this control system will adjust the rate of fresh ammonia flow in the desired direction until a differential pressure does not exist. The aqueous solution is withdrawn from the absorber via conduit 55 and passed to pump 54 where the pressure is raised to approximately 2,000 p. s. i. g. and from whence it is introduced to conduit 4 and is sent to the preheater 5 along with the paraldehyde from vessel 1.

The absorber is equipped with a pressure controller 52 which is operably connected to valve 53 and causes this valve to open to vent in case the pressure exceeds the safe limit for the vessel. Venting is normally required periodically to purge inert or insoluble gases from the absorber.

Figure 2 is an enlarged section of that part of Figure 1 showing the absorber 35 and the control apparatus. The numbers are the same as were used for the same elements in Figure 1.

Referring to Figure 3, the total vapor pressure, in pounds per square inch absolute (p. s. i. a.), is plotted against the weight percent ammonia in aqueous solution at various temperatures. The slope of the curve between 30 and 40 weight percent ammonia in water at 115° F. is 2.5 p. s. i. change in vapor pressure for each percent change in composition. The system can tolerate a change of plus or minus 2 percent in composition which would be equivalent to plus or minus 5 p. s. i. change in pressure at 115° F. The differential pressure controller 47 of Figures 1 and 2 should detect a change of plus or minus 1 p. s. i. or less and therefore the sensitivity of the apparatus is well within the tolerable composition limits.

Referring to Figure 4, the vapor pressure, in pounds per square inch absolute (p. s. i. a.), is plotted against temperature for various concentration of aqueous solutions. If it is desired to hold the ammonia concentration at 35 weight percent and 115° F. in the liquid phase in the absorber, there will be exerted 39 p. s. i. a. vapor pressure. Now, if the known solution in sealed bulb 45 (Figures 1 and 2) is 30 weight percent, the pressure in the bulb is approximately 28 p. s. i. a. or a difference registered on the differential pressure controller of +11 p. s. i. In order to hold a liquid phase concentration of 35 weight percent, the differential pressure controller must be set for +11 p. s. i. differential. If the operating temperature level of the absorber changes to 130° F., the solution in the sealed bulb 45 will then exert 37 p. s. i. a. vapor pressure and the desired +11 p. s. i. differential pressure will control the absorber so as to produce an aqua ammonia of 48 p. s. i. a. vapor pressure at 130° F. corresponding to about 34 weight percent ammonia. This error arises from the slope of the vapor pressure versus composition curve (Figure 3) at 130° F., whose slope is about 3 p. s. i. per 1 percent ammonia. Similarly at 90° F. since the slope is about 1.5 p. s. i. per 1 percent, the aqua ammonia solution produced at +11 p. s. i. differential pressure will be 37.5 weight percent. The examples cited are extreme, since in practice the solution in the sealed bulb will be selected so that the differential pressure controller will need to be set to control at only a few pounds differential, not over 10 or preferably a zero differential. Also the temperature will be controlled so as not to vary more than plus or minus 5 degrees and preferably plus or minus 2 degrees. Since the pressure in the bulb is the base pressure, pressures above this are considered plus differentials.

I have described my invention in terms of one of its preferred embodiments. Those skilled in the art will see many modifications which can be made without departing from the scope of this invention. For example, it is within the skill of the art to supply the necessary valves, pressure regulators, pumps, relief valves and the like.

I claim:

1. The process for preparing an aqueous ammonia solution of concentration within a predetermined weight percent range, said process comprising continuously introducing ammonia into the lower section of an absorption zone, continuously introducing a liquid aqueous medium into the upper section of said absorption zone, maintaining a liquid level in said absorption zone above the level of introducing said ammonia and below the level of introducing said aqueous medium so as to divide said absorption zone into a liquid phase zone and a vapor phase zone, detecting the differential pressure between the vapor pressure of an aqueous solution of ammonia of known concentration submerged in said liquid phase and the vapor pressure of said vapor phase, regulating the flow of said ammonia to said absorption zone in response to changes in said differential pressure, contacting said introduced ammonia with said aqueous medium in said absorption zone, and continuously withdrawing resulting aqueous ammonia solution from the bottom of said absorption zone.

2. The process of claim 1 wherein a portion of the said withdrawn aqueous amomnia solution is added to the said aqueous medium being introduced into said absorption zone and wherein the resulting mixture is sprayed downward through the said vapor phase.

3. The process for preparing an aqueous ammonia solution of a concentration within a predetermined weight percent range, said process comprising continuously introducing a stream of ammonia into the lower section of an absorption zone, the said lower section containing therein a capsule containing an aqueous solution of ammonia of known concentration; the said ammonia stream being comprised of plurality of ammonia streams of which at least one is independently variable, continuously introducing a liquid aqueous medium into the upper section of said absorption zone, gravitating said liquid downward to form a liquid pool in said absorption zone, detecting the level of said pool, controlling the rate of introducing said aqueous medium to said absorption zone in response to said liquid level variations so as to maintain said liquid level above the level of introducing said ammonia and above the said capsule containing aqueous amonia and below the level of introducing said aqueous medium so as to form a liquid phase and a vapor phase in said absorption zone, allowing the aqueous ammonia in said capsule to come in temperature equilibrium with said liquid phase, detecting the differential pressure between the vapor pressure of the said aqueous ammonia of known concentration and the vapor pressure of the said vapor phase in said absorption zone, regulating the flow of ammonia of a second of the said plurality of ammonia streams in response to variations in said differential pressure from a predetermined pressure differential, contacting said introduced ammonia stream with said aqueous medium in said absorption zone thereby forming an aqueous solution of ammonia in said absorption zone, continuously withdrawing aqueous ammonia from said absorption zone, and taking a portion of said withdrawn aqueous ammonia and adding it to the said aqueous medium being introduced to the absorption zone.

4. The process of claim 3 wherein the portion of aqueous ammonia being added to the aqueous medium is first cooled to a predetermined temperature and wherein the predetermined differential pressure is no greater than ten pounds per square inch.

5. An apparatus for producing aqueous ammonia of a predetermined concentration, said apparatus comprising in combination an absorption vessel, means for introducing ammonia into a lower section of said absorption vessel, means for introducing liquid into an upper section of said absorption vessel, means for detecting liquid level in said absorption vessel, means for controlling flow through said means for introducing liquid in said upper section, said controlling means being operably connected to and responsive to said means for detecting said liquid level, a cell containing an aqueous ammonia solution of known concentration disposed in said absorption vessel below said liquid level, a differential pressure controller operably connected with said cell and said absorption vessel above said liquid level so as to be responsive to the difference in vapor pressure between said cell and said vessel, a flow regulator operably connected in said means for introducing ammonia into said absorption vessel, said flow regulator being operably connected to and responsive to said differential pressure controller, and means for removing liquid from bottom of said absorption vessel.

6. An apparatus for producing aqueous ammonia of a predetermined concentration, said apparatus comprising in combination an absorption vessel, means for introducing ammonia into a lower section of said absorption vessel, means for introducing liquid into an upper section of said absorption vessel, means for detecting liquid level in said absorption vessel, means for controlling flow through said means for introducing liquid in said upper section, said controlling means being operably connected to and responsive to said means for detecting said liquid level, a cell containing an aqueous ammonia solution of known concentration disposed in said absorption vessel below said liquid level, a differential pressure controller operably connected with said cell and said absorption vessel above said liquid level so as to be responsive to the difference in vapor pressure between said cell and said vessel, a flow regulator operably connected in said means for introducing ammonia into said absorption vessel, said flow regulator being operably connected to and responsive to said differential pressure controller, and means for removing liquid from bottom of said absorption vessel, means for circulating a portion of said withdrawn liquid to said means for introducing liquid into said absorption vessel, means for cooling operably connected in said circulating means, a temperature controller, a temperature sensing device in said circulating means and operably connected to said temperature controller, and said cooling means being operably connected to said temperature controller responsive to temperature changes.

7. The apparatus of claim 6 wherein the means for introducing liquid into said upper section of said absorption vessel is a spraying device.

8. The apparatus of claim 7 wherein the means for introducing ammonia into said lower section of said absorption vessel is comprised of a plurality of conduits connecting with a single header wherein the single header enters said absorption vessel, and wherein said flow regulator is connected in one of said plurality of conduits.

References Cited in the file of this patent

UNITED STATES PATENTS

| | | |
|---|---|---|
| 586,950 | Frerichs | July 20, 1897 |
| 1,885,012 | Harvey | Oct. 25, 1932 |
| 2,023,199 | Harvey | Dec. 3, 1935 |
| 2,037,125 | Fenske | Apr. 14, 1936 |
| 2,050,020 | Schmidt | Aug. 4, 1936 |
| 2,211,058 | Guthmann | Aug. 13, 1940 |
| 2,373,646 | Binnington | Apr. 17, 1945 |
| 2,444,358 | Markson | June 29, 1948 |
| 2,547,684 | Bourdon | Apr. 3, 1951 |
| 2,605,264 | Hoog | July 29, 1952 |
| 2,615,022 | Mahan | Oct. 21, 1952 |
| 2,675,820 | Harrison | Apr. 20, 1954 |

FOREIGN PATENTS

| | | |
|---|---|---|
| 259,312 | Germany | Apr. 30, 1913 |
| 129,808 | Great Britain | July 17, 1919 |
| 79,826 | Sweden | Mar. 13, 1934 |